UNITED STATES PATENT OFFICE.

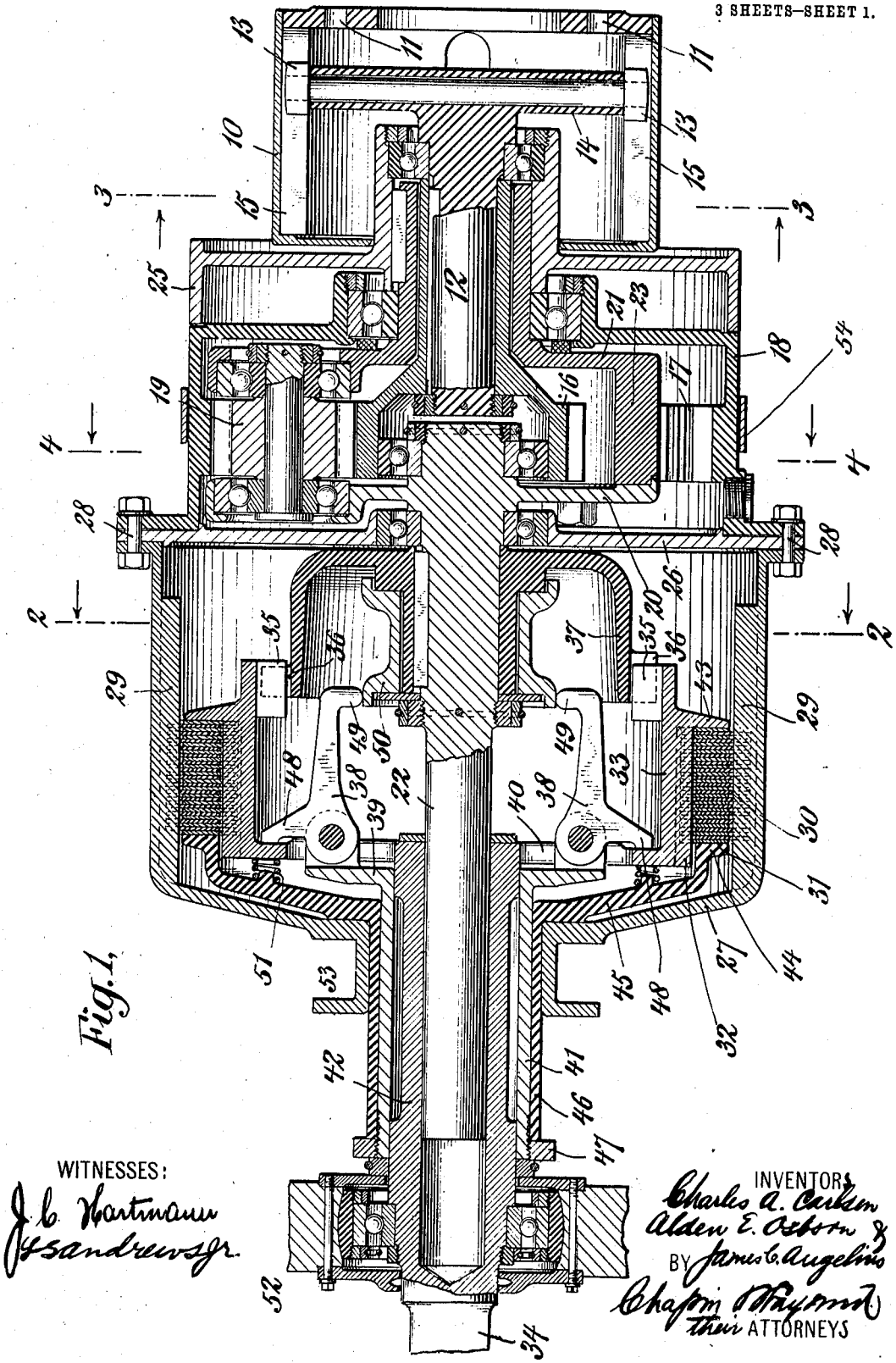

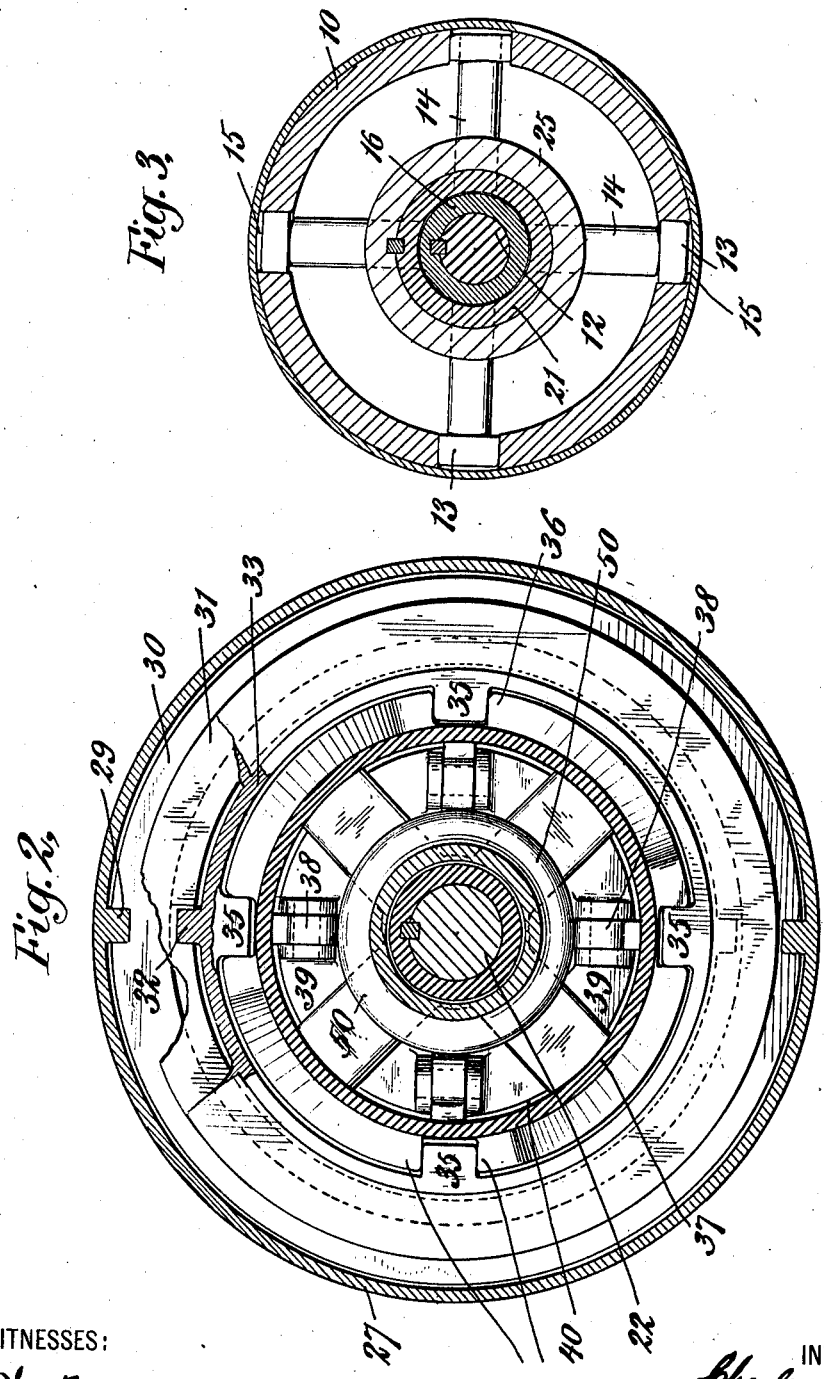

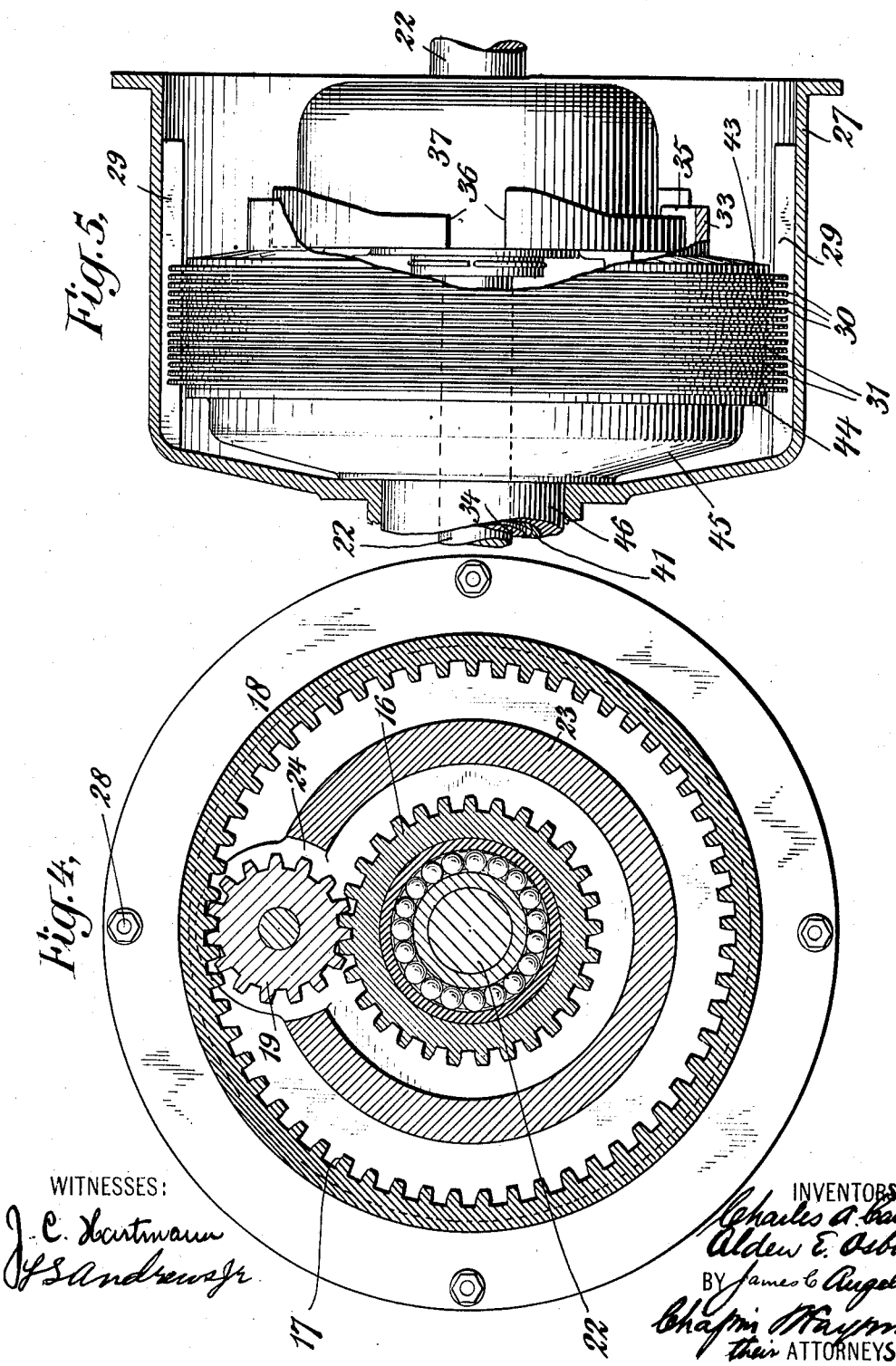

CHARLES A. CARLSON, OF BROOKLYN, ALDEN E. OSBORN, OF NEW YORK, AND JAMES C. ANGELINO, OF BROOKLYN, NEW YORK, ASSIGNORS TO CARLSON MOTOR & TRUCK COMPANY, OF PHILADELPHIA, PENNSYLVANIA, A CORPORATION OF NEW YORK.

TRANSMISSION-GEARING.

970,790.  Specification of Letters Patent.  Patented Sept. 20, 1910.

Application filed June 17, 1909. Serial No. 502,663.

*To all whom it may concern:*

Be it known that we, CHARLES A. CARLSON, a citizen of the United States of America, and a resident of Brooklyn, county of Kings, and State of New York, ALDEN E. OSBORN, a citizen of the United States of America, and a resident of New York, borough of Bronx, city and State of New York, and JAMES C. ANGELINO, a subject of the Crown of Italy, and a resident of Ozone Park, borough of Brooklyn, county of Queens, and State of New York, have invented certain new and useful Improvements in Transmission-Gearing, of which the following is a specification, reference being had to the accompanying drawings, forming a part thereof.

Our invention relates to improvements in transmission gearing of the type in which changes of relative speed and direction are effected between the driving and driven elements, and our invention relates, particularly, to the planetary type of transmission gearing in which an intermediate gear is given a planetary movement around a central or sun gear in addition to the rotational movement about its own axis.

The object of our invention is to improve and simplify mechanism of this character; to render the operation of the various parts by which changes in speed or direction of drive are accomplished as automatic as possible so as to compel the proper movements thereof in sequence, whereby to prevent an improper operation of the parts; to provide such form and construction of bearings and bearing surfaces as to cause the various working parts to wear to a minimum degree; and to provide certain adjustments whereby compensation may be made for wear in parts which, by reason of the fact that they operate by friction between their surfaces, are liable to wear.

To these ends, our invention consists in certain novel details of construction and combinations of parts, such as will be best understood by reference to a complete operative structure, and for this purpose we will now proceed to describe in detail an embodiment of our invention, having reference to the accompanying drawings illustrating the same, and will then point out the novel features in claims.

In the drawings: Figure 1 is a view in central longitudinal section through the transmission gearing. Fig. 2 is a transverse sectional view therethrough upon the plane of the line 2—2 of Fig. 1. Fig. 3 is a transverse sectional view upon the plane of the line 3—3 of Fig. 1. Fig. 4 is a transverse sectional view upon the plane of the line 4—4 of Fig. 1. Fig. 5 is a detail view in partial section and partial side elevation of certain portions of the gearing including the two clutches employed.

The driving member is here shown as in the form of a hollow hub 10, the web of which is provided with holes 11 for receiving bolts by which it may be bolted to the fly wheel of the motor or other power element. The said hollow hub 10 is arranged in driving relation with a shaft 12, the said shaft and hub having, however, a sliding connection by means of which the said shaft may be moved longitudinally with respect to the said hub 10. The said sliding connection is effected by means of a plurality of slides 13 which are carried by spider arms 14 secured to the shaft 12, the said slides being disposed within guideways 15 upon the interior of the said hub 10. The end of the shaft 12 opposite to that which carries the spider arms 14, is provided with a central or sun gear 16, and surrounding the said sun gear and concentric therewith is an internal or ring gear 17 which is carried by a drum 18. A pinion 19, constituting a planetary gear, is disposed between the sun gear 16 and the ring gear 17, in mesh with both of them, the said planetary gear being mounted to rotate in bearings carried by two disks 20—21 mounted upon, and secured to rotate with, a secondary shaft 22. The disks 20 and 21 are preferably secured together by means of a web 23 whereby a rigidity of the structure is attained, the said web 23 being conveniently cut away at 24 to admit the pinion 19. A brake drum 25 is secured to rotate with the said disks 20 and 21 and the said shaft 22, being conveniently keyed upon the hub of the disk 21 for this purpose. The drum 18 forms a part of a casing which includes a head 26, the drum 18, and a drum 27, the three members being securely fastened together by means of bolts 28. The drum 27 is provided with a plurality of inwardly projecting portions or keys 29 which rotatively engage one set of the disks 30 of a friction clutch, the other set 31 of which is engaged by keys or projections 32 upon a clutch member 33 which is carried by the driven shaft 34. The member 33 is also provided with a set of inwardly projecting portions or teeth 35 which are adapted to co-engage with abutments 36 upon a head 37, the said head 37 being secured fast upon the secondary shaft 22. The teeth or projections 35 and the abutments 36, with the parts that carry them, constitute members of a jaw or positive clutch as will presently be described. Operating arms 38 for the friction clutch are pivotally connected to a head 39, the clutch member 33 having cut out portions 40 to permit of such connection. The head 39 is preferably provided with an extended hub 41 which finds a bearing upon a hollow portion 42 of the shaft 34, the said portion 42 being formed hollow to receive the end of the shaft 22 as will be well understood by reference to Fig. 1 of the drawings. The two sets of disks 30 and 31 of the beforementioned friction clutch are pressed endwise at one end by means of an extended portion 43 of the clutch member 33, which constitutes an abutment, and at the other end by means of an abutment 44 formed upon a head 45. The said head 45 is preferably provided with an extended bearing hub 46 in the form of a sleeve which surrounds the aforesaid hub 41; and an adjusting nut 47 screw threaded upon the sleeve 41, and bearing against the end of sleeve 46, constitutes an adjustment between the two said sleeves 41 and 46 whereby the head 45 may be accurately adjusted with respect to the head 39. The operating arms 38 have laterally projecting portions 48 which bear against the clutch member 33, and fingers 49 which are engaged by a cam 50 which is secured to and carried by the head 37. With the parts in the position in which they are shown in Fig. 1, the cam 50 has operated upon the arms 38 whereby to force the abutments 43 and 44 of the clutch member 33 and the head 45 respectively together whereby to force the two sets of clutch disks 30 and 31, into intimate frictional engagement with each other. In another position of the said cam with relation to the operating arms 38, such pressure will be relieved and springs 51 will force the abutments 43 and 44 apart to the end that the two sets of disks will be permitted to rotate with respect to each other.

The structure, as a whole, is supported at one end by a bearing 52 which engages the driven shaft 34, and at the other end by the hub 10 which is carried by the fly wheel or other power element. The said shaft 34, with the hubs or sleeves 41 and 46 mounted thereon, together with the parts that the said hubs or sleeves carry, and the said hub 10, are the only parts so far described which have no substantial longitudinal movement,—the casing comprising the drum 27, the head 26, and the drum 18, together with the brake drum 25, the secondary shaft 22, the primary shaft 12, and the various parts carried thereby being adjustable longitudinally, as a whole, with respect to the said shaft 24, and the said hub 10; a collar 53 is provided upon the casing, being shown as an extension of the head 27, for this purpose. The various changes in speed and direction of drive between the driving member 10 and the driven shaft 34 are brought about by these longitudinal movements of the casing and parts carried thereby, together with a proper manipulation of a brake band 54 or other restraining member, which is adapted to engage the drum 18 of the casing, or the drum 25, as the case may be, to restrain, at such time, rotative movement of the part so engaged. When this longitudinal movement is given to the casing no corresponding movement is given to this brake band or restraining member, so that the casing is moved with respect to the said brake band. By this means, the brake band is, at certain times, located around the drum 18 of the said casing and at other times around the brake drum 25.

The operation of the mechanism is as follows: With the parts adjusted in the position in which they are shown in Fig. 1, i. e. with the casing and parts carried thereby moved as far as possible to the right as viewed in Fig. 1, the parts will be connected in such relation as to transmit driving movements from the hub 10 to the shaft 34 in the same direction, and at the same speed, that is to say, the parts will be connected in what is known as "high speed forward driving relation." At such time, the secondary shaft 22 and driven shaft 34 will be secured together in rotative engagement by means of the fact that the abutments 36, upon the head 37 which is secured to the secondary shaft, are in engagement with the teeth 35 of the clutch member 33 which is secured to the driven shaft. At the same time, the casing will be rotatively secured to the secondary shaft and driven shaft by the fact that the two sets of disks 30 and 31 will have been forced into intimate frictional engagement with each other by means of the arms 38 in the manner aforesaid, thereby locking the said casing to the clutch member 33, and hence also to the secondary shaft 22. The result, however, of locking the secondary shaft and casing together will be to prevent the rotation of the planetary pinion 19 about its axis because of its intermeshing with the internal gear 17, hence, therefore, when driving movements are imparted through the hub 10 and primary shaft 12 to the sun gear 16, the casing, secondary shaft and driven shaft will all be rotated together therewith at the same speed and in the same direction. Such condition is known in this art by the term "direct high speed drive." When it is desired to transmit driving movements to the driven shaft at a relatively lower rate of speed but still in the same direction, the casing and parts carried thereby will be moved bodily to the left as viewed in Fig. 1, to an intermediate position. The distance that the casing and parts carried thereby is thus moved will be sufficient to allow the fingers 49 to be received within the lower portion of the cam 50 so as to relieve the pressure upon the friction disks of the disk clutch to permit them to move with relation to each other, while at the same time, it will not be sufficient to release the abutments 36 carried by the head 37 from engagement with the projections 35 carried by the clutch member 33, (it being remembered that the head 37 carrying the cam, moves with the casing, while the clutch member 33, carried by the shaft 34 and the heads 39 and 45 carried by the sleeves 41 and 46, respectively, do not move with the casing). In this condition of the parts, the jaw clutch will lock the secondary and driven shafts together through the jaw clutch 35—36, but the said parts will be free to revolve with respect to the casing. When the parts have been moved to this intermediate position, the brake band 54 or other restraining device will be operated so as to hold the casing against rotative movement, with the result that driving movements imparted to the sun gear will cause the planetary gear to rotate about its own axis, and also to move in a planetary path about the axis of the secondary shaft. Movements will be thus imparted to the secondary shaft at a lower rate of speed in the same direction and thence to the driven shaft through the jaw clutch connection aforesaid.

The third position of the parts is with the casing moved all the way over to the left as viewed in Fig. 1, the outside face of the collar 53 being at such time close up against the contiguous face of the adjusting nut 47. When the casing is so moved, the brake band 54 will be clear of the drum 18 of the said casing and will be in a position to engage the brake drum 25. Upon operation of this restraining device to hold the drum 25 against rotation, the parts will be in such a position that driving movements will be transmitted from the driving element to the driven shaft in a reverse direction, and at a slow rate of speed. With the parts in such position, the abutments 36 of the head 37 will have been moved to such a position as to be entirely clear of the projections 35 of the clutch member 33 whereby the jaw clutch will be disengaged and the secondary and driven shafts will be out of direct rotative engagement with each other. The cam 50 will, however, have moved to a position where the operating arms 38 will have been once more caused to force the clutch disks 30—31 into intimate frictional engagement with each other to lock the clutch member 33 to the casing whereby the casing and driven shaft will be secured to rotate together. Driving movements from the hub 10, primary shaft 12 and sun gear 16 will now be transmitted through the pinion 19, (the axis of which is at this time held stationary through the restraining of the drum 25,) in a reverse direction, and at a low rate of speed to the casing, and such movement will be then transmitted through the disk clutch directly to the driven shaft 34. At this time, the secondary shaft is, of course, being held stationary with the parts carried thereby, by reason of the fact that the drum 25 which is secured fast thereto, is held stationary. With the casing arranged to move longitudinally in this manner with respect to the brake band or other restraining device, it will be obvious that the danger of operating the restraining device at the wrong time, or if more than one restraining device is employed, of operating the wrong restraining device, is entirely eliminated. The only effect of operating the restraining device when the parts are connected in high speed direct driving relation, would cause the same to act as a brake in the ordinary manner to slow the parts down and no undue strain would be put upon the parts. When the parts are adjusted in low speed forward or reverse connection, the operation of the restraining member can only affect the proper parts, namely, the casing or the drum upon the secondary shaft respectively.

What we claim is:

1. In transmission gearing the combination with a driving element, a driven element and change speed gearing between them, of two clutches including operating elements, for connecting the said gearing in different driving relations, the said operating elements including an annular cam longitudinally movable with respect to the said driven element, but partaking of the rotational movement of the said change speed gearing, the said operating elements adapted to operatively connect one of the said clutches when in one position, the other when in another position, and both when in a third position.

2. In transmission gearing, the combination with a driving element, a driven element, and change speed gearing between them, of two clutches including movable operating elements, for connecting the said gearing in different driving relations, and means for longitudinally moving the said operating elements, the said operating elements including an annular cam and being adapted to operatively connect one only of the said clutches when at the limit of their movement in one direction, to operatively connect the other only of the said clutches when in an intermediate position, and to operatively connect both of the said clutches when at the limit of their movement in the other direction.

3. In transmission gearing the combination with a driving element, a driven element and change speed gearing between them, the driving and driven elements being arranged exially in line with each other, of two clutches, arranged concentrically with respect to the said elements, for connecting the gearing in different driving relations, the said clutches including operating elements one of which is in the form of a concentric tubular cam, the said operating elements being longitudinally movable with respect to the driving and driven elements, for the purpose of operatively connecting the said clutches, the said operating elements being adapted to operatively connect one only of the said clutches when in one position, the other only when in another position, and both when in a third position.

4. In transmission gearing the combination with a driving element, a driven element and an intermediate element, all arranged axially in line with each other, and planetary gearing comprising a central gear wheel rotatably connected with the driving element, a planetary gear wheel carried by the intermediate element, and a gear ring mounted concentrically with the said central gear wheel, of clutch mechanism including two sets of co-engaging clutch elements and operating means therefor, one set of the said co-engaging clutch elements being arranged for connecting the driving element with the intermediate element, and the other set of the said co-engaging clutch elements being arranged for connecting the driven element with the gear ring, the said operating means including a tubular cam longitudinally movable in the line of the axis of the three said elements, and being adapted to operatively connect one of the set of clutch elements when in one position, the other when in another position, and both when in a third position,—and means for longitudinally moving the said operating means to the three said positions.

5. In transmission gearing the combination with a driving element, a driven element and an intermediate element, all arranged axially in line with each other, and planetary gearing comprising a central gear wheel rotatively connected with the driving element, a planetary gear wheel carried by the intermediate element, and a gear ring mounted concentrically with the said central gear wheel and engaged by the said planetary gear wheel, of a sliding jaw clutch, one member of which is carried rotatively by the intermediate element, and the other member of which is carried rotatively by the driven element, a friction clutch, one member of which is rotatively connected with the driven element, and the other member of which is rotatively connected with the said gear ring, means for moving the member of the jaw clutch which is carried by the driven element, operating arms for the said friction clutch, and means movable with the longitudinally movable member of the sliding jaw clutch for actuating the said arms when at the limit of its longitudinal movement in either direction, and for releasing the said arms when in an intermediate position, the two members of the said jaw clutch being maintained in engagement in the said intermediate position, and in one only of the said other positions.

6. In transmission gearing the combination with a primary shaft, a secondary shaft, and a driven shaft, all arranged axially in line with each other, and planetary gearing comprising a central gear wheel mounted fast upon the primary shaft, a planetary gear wheel carried by the secondary shaft, and a gear ring mounted concentrically with the said central gear wheel and engaged by the said planetary gear wheel, of a sliding jaw clutch, one member of which is mounted fast upon the secondary shaft and the other member of which is mounted fast upon the driven shaft, a friction clutch, one member of which is carried by the driven shaft and the other member of which is connected to rotate with the said gear ring, means for moving the secondary shaft longitudinally with respect to the driven shaft, and means carried by the secondary shaft for operatively engaging and disengaging the said friction clutch when the said secondary shaft is so moved.

7. In transmission gearing the combination with a primary shaft, a secondary shaft, and a driven shaft, all arranged axially in line with each other, and planetary gearing comprising a central gear wheel mounted fast upon the primary shaft, a planetary gear wheel carried by the secondary shaft, and a gear ring mounted concentrically with the said central gear wheel and engaged by the said planetary gear wheel, of a sliding jaw clutch, one member of which is mounted fast upon the secondary shaft and the other member of which is mounted fast upon the driven shaft, a friction clutch, one member of which is carried by the driven shaft and the other member of which is connected to rotate with the said gear ring, means for moving the said secondary shaft and primary shaft together with the parts carried thereby longitudinally with respect to the driven shaft, means carried by the secondary shaft for operatively engaging and disengaging the said friction clutch when the said primary and secondary shafts are so moved, a driving element arranged in axial alinement with the said primary shaft, and means between the driving element and the primary shaft connecting them to rotate together but permitting relative longitudinal movement between them.

8. The combination with driving and driven elements, both of which are longitudinally stationary, intermediate power transmitting elements longitudinally movable between them, the said intermediate elements including a sun gear, a planetary pinion and a ring gear surrounding the same, of a clutch between the driven member and the ring gear, a longitudinally movable cam for operating the said clutch when the said intermediate elements are moved to the limit of their movements in either direction, and to leave the said clutch free in an intermediate position, and means for longitudinally moving the cam.

9. The combination with driving and driven elements, both of which are longitudinally stationary, intermediate power transmitting elements longitudinally movable between them, the said intermediate elements including a sun gear, a planetary pinion, and a ring gear surrounding the same and concentric with the sun gear, a clutch between the driven member and the ring gear, an annular cam mounted concentrically with the driven shaft and longitudinally movable with the said power transmitting elements, and means operated by the said cam at the limit of its longitudinal movement in either direction to operatively engage the said clutch, said means being arranged to release the said clutch when the said cam is in an intermediate position.

10. The combination with driving and driven elements, both of which are longitudinally stationary, intermediate power transmitting elements longitudinally movable between them, the said intermediate elements including a sun gear, a planetary pinion, and a ring gear surrounding the same and concentric with the sun gear, a clutch between the driven member and the ring gear, an annular cam mounted concentrically with the driven shaft, the said cam being arranged to be moved longitudinally of its axis, and means operated by the said cam at the limit of its longitudinal movement in either direction to operatively engage the said clutch, said means being arranged to release the said clutch when the said cam is in an intermediate position.

11. In transmission gearing the combination with a driving element, a driven element, and an intermediate element, all arranged axially in line with each other, and planetary gearing comprising a central gear wheel connected to rotate with the driving element, a planetary gear wheel carried by the intermediate element, and a gear ring mounted concentrically with said central gear wheel, of a clutch for connecting the driven element with the intermediate element, another clutch for connecting the driven element with the gear ring, and a casing surrounding and inclosing the said gearing and clutches and to which the said gear ring is secured, the said casing with the parts carried thereby being adapted to be moved longitudinally with respect to the driven element, and means longitudinally movable with the casing for operating the clutches.

12. In transmission gearing the combination with a driving element, a driven element, and an intermediate element, all arranged axially in line with each other, and planetary gearing comprising a central gear wheel connected to rotate with the driving element, a planetary gear wheel carried by the intermediate element, and a gear ring mounted concentrically with the said central gear wheel and engaged by the said planetary gear wheel, of a sliding jaw clutch, one member of which is carried by the intermediate element to rotate therewith, and the other member of which is carried by the driven element to rotate with it, a friction clutch, one member of which is connected to rotate with the driven element, and the other member of which is connected to rotate with the said gear ring, a closed casing for surrounding and inclosing the planetary gear ring, the intermediate element and the said clutches and having secured thereto the said gear ring, the said casing being longitudinally movable with respect to the driven element, operating arms for the said friction clutch, and means movable longitudinally with the said casing for actuating the said arms, the said movable member of the sliding jaw clutch being also longitudinally movable with the said casing.

13. In transmission gearing the combination with a longitudinally stationary driven shaft, of a longitudinally movable casing mounted thereon, a set of clutch disks connected to rotate with the said casing but free as to relative longitudinal movement, a clutch member secured to rotate with the said driven shaft, a set of clutch disks arranged intermediate of the first said set of disks, and mounted to rotate with the said clutch member, the said clutch member being provided with an abutment for pressing against the disks at one end thereof, a head having an abutment for pressing against the disks at the other end thereof, the said head being provided with a sleeve mounted concentrically upon the said driven shaft, a concentric sleeve mounted between the said hub and the said driven shaft, operating arms carried by the said sleeve and adapted to operate against the said clutch member, means carried with the said casing for operating the said arms, and an adjusting nut mounted upon the said sleeve for longitudinally adjusting the same with respect to the said hub; together with a driving element, gearing between the said driving element and the said casing, and means for restraining different elements of the said gearing.

14. In transmission gearing, the combination with primary driving means and a driven shaft, of a driving shaft and an intermediate shaft both located between the said primary driving means and the driven shaft and axially in line therewith, intermeshing gear wheels carried by the said driving and intermediate shafts, a third gear wheel intermeshing with one of the said gear wheels, clutch mechanism for connecting the said intermediate shaft or the last said gear wheel with the driven shaft, and means for moving the driving shaft, the intermediate shaft, and parts carried thereby, longitudinally with respect to the primary driving means and the driven shaft.

15. In transmission gearing, the combination with primary driving means and a driven shaft, of a driving shaft and an intermediate shaft both located between the said primary driving means and the driven shaft and axially in line therewith, intermeshing gear wheels carried by the said driving and intermediate shafts, a third gear wheel intermeshing with one of the said gear wheels, clutch mechanism for connecting the said intermediate shaft or the last said gear wheel with the driven shaft, and means for moving the driving shaft, the intermediate shaft, and parts carried thereby, longitudinally with respect to the primary driving member and the driven shaft, the said parts in their movement effecting the connection of the intermediate shaft or the said third gear wheel, or both, through the said clutch mechanism with the said driven shaft.

16. In transmission gearing, the combination with primary driving means and a driven shaft, of a driving shaft and an intermediate shaft both located between the said primary driving means and the driven shaft and axially in line therewith, intermeshing gear wheels carried by the said driving and intermediate shafts, a third gear wheel intermeshing with one of the said gear wheels, clutch mechanism for connecting with said intermediate shaft or the last said gear wheel with the driven shaft, a casing for inclosing the said driving shaft, intermediate shaft, gear wheels, and clutch mechanism, and means for moving the said casing, driving shaft, intermediate shaft, and parts carried thereby, longitudinally with respect to the primary member and the driven shaft.

17. In transmission gearing, the combination with primary driving means and a driven shaft, of a driving shaft and an intermediate shaft both located between the said primary driving means and the driven shaft and axially in line therewith, intermeshing gear wheels carried by the said driving and intermediate shafts, a third gear wheel intermeshing with one of the said gear wheels, clutch mechanism for connecting the said intermediate shaft or the last said gear wheel with the driven shaft, a casing for inclosing the said driving shaft, intermediate shaft, gear wheels, and clutch mechanism, and means for moving the said casing, driving shaft, secondary shaft, and parts carried thereby, longitudinally with respect to the primary member and the driven shaft, the said parts in their movement effecting the connection of the intermediate shaft or the said third gear wheel, or both, through the said clutch mechanism, with the said driven shaft.

18. In transmission gearing, the combination with primary driving means and a driven shaft, of driving and intermediate elements concentrically arranged with respect thereto, the driving element including a sun gear, a planetary gear carried by the intermediate element and arranged in mesh with the sun gear, a ring gear in engagement with the planetary gear, clutch mechanism for connecting either the ring gear or the intermediate element with the driven shaft, means carried by the said intermediate element for operating the said clutch mechanism, and means for moving the driving and intermediate elements, and parts carried thereby, longitudinally with respect to the driven shaft.

19. In transmission gearing, the combination with primary driving means and a driven shaft, of driving and intermediate elements concentrically arranged with respect thereto, the driving element including a sun gear, a planetary gear carried by the intermediate element and arranged in mesh with the sun gear, a ring gear in engagement with the planetary gear, clutch mechanism for connecting either the ring gear or the intermediate element with the driven shaft, means carried by the said intermediate element for operating the said clutch mechanism, a casing carrying the ring gear and inclosing the clutch mechanism, the driving, and intermediate elements, and parts carried thereby, and means for moving the casing, the driving, and driven elements, and the parts carried by the said casing, driving, and driven elements, longitudinally with respect to the driven shaft.

20. In transmission gearing, the combination with a driving shaft, an intermediate shaft, and a driven shaft, all arranged axially in line with each other, a sun gear carried by the driving shaft, a planetary gear carried by the intermediate shaft in mesh with the sun gear, and a ring gear in mesh with the said planetary gear, of clutch mechanism for connecting either the said intermediate shaft or the said ring gear with the driven shaft, an inclosing casing for the clutch mechanism and gear wheels, the said casing having bearings radially in line with portions of the said driving shaft, intermediate shaft, and driven shaft respectively, and means for moving the said driving and intermediate shafts, the said casing, and parts carried by the said shafts and casing, longitudinally with respect to the said driven shaft.

21. In transmission gearing the combination with a driving element, a driven element, change speed gearing between them, and an inclosing casing, of clutch mechanism for connecting the said gearing in different driving relations, said clutch mechanism including a set of disks connected to rotate with the driven element, and another set of disks connected to rotate with the said casing, means for moving the casing longitudinally with respect to the disks carried thereby, abutments independent of the casing for engaging the end disks of the two sets, and means movable with the said casing for pressing the said abutments together.

22. In transmission gearing the combination with a driving element, a driven element, change speed gearing between them, and an inclosing casing, of clutch mechanism for connecting the said gearing in different driving relations, said clutch mechanism including a set of disks connected to rotate with the driven element, and another set of disks connected to rotate with the said casing, means for moving the casing longitudinally with respect to the disks carried thereby, abutments, independent of the casing, for pressing the said disks together, and means for adjusting the normal position of the two said abutments with respect to each other.

23. In transmission gearing the combination with a driving element, a driven element, change speed gearing between them, and an inclosing casing, of clutch mechanism for connecting the said gearing in different driving relations, said clutch mechanism including a set of disks connected to rotate with the driven element, and another set of disks connected to rotate with the said casing, means for moving the casing longitudinally with respect to the disks carried thereby, abutments, independent of the casing, for pressing the said disks together, means for adjusting the normal position of the two said abutments with respect to each other, and means accessible from the exterior of the casing for adjusting the normal position of the two said abutments with respect to each other.

24. In transmission gearing the combination with a driving shaft, an intermediate shaft, a driven shaft, change speed gearing between them, and an inclosing casing, of clutch mechanism for connecting the said gearing in different driving relations, said clutch mechanism including a set of disks connected to rotate with the driven shaft, and another set of disks connected to rotate with the said casing, an abutment carried by the intermediate shaft, means for moving the casing longitudinally with respect to the disks carried thereby, abutments, independent of the casing, for engaging the end disks of the two sets, one of the said abutments being carried by the driven shaft, a head carrying the other said abutment and provided with a sleeve surrounding the said driven shaft, another sleeve mounted concentrically therewith, means carried by the second said sleeve for drawing the two said abutments together, and an adjusting nut between the two said sleeves for adjusting their normal position with respect to each other.

25. In transmission gearing the combination with a driving shaft, a driven shaft, change speed gearing between them, and an inclosing casing, of clutch mechanism for connecting the said gearing in different driving relations, said clutch mechanism including a set of disks connected to rotate with the driven shaft, and another set of disks connected to rotate with the casing, a sleeve concentric with the driven shaft, operating members carried thereby for moving the sleeve longitudinally with respect to the driven shaft, an abutment carried by the driven shaft engaging the sets of disks at one end thereof, a head provided with an abutment for engaging the sets of disks at the other end thereof, the said head having a sleeve mounted concentrically with the first said sleeve, and an adjusting nut for adjusting the normal relative position of the two said sleeves with respect to each other.

26. In transmission gearing the combination with a driving element, a driven element, change speed gearing between them, and an inclosing casing, of clutch mechanism for connecting the said gearing in different driving relations, said clutch mechanism including a set of disks connected to rotate with the driven element, and another set of disks connected to rotate with the casing, a sleeve concentric with the driven element, operating members carried thereby for moving the sleeve longitudinally with respect to the driven element, an abutment carried by the driven element engaging the sets of disks at one end thereof, a head provided with an abutment for engaging the sets of disks at the other end thereof, the said head having a sleeve mounted concentrically with the first said sleeve, an adjusting nut for adjusting the normal relative position of the two said sleeves with respect to each other, and means for moving the casing longitudinally with respect to the abutments and the disks.

In witness whereof we have hereunto set our hands this 28th day of May, 1909.

CHARLES A. CARLSON.
ALDEN E. OSBORN.
JAMES C. ANGELINO.

Witnesses:
D. HOWARD HAYWOOD,
LYMAN S. ANDREWS, Jr.